United States Patent [19]

Danielson

[11] 4,302,250
[45] Nov. 24, 1981

[54] GLASS ENVELOPES FOR TUNGSTEN-HALOGEN LAMPS

[75] Inventor: Paul S. Danielson, Corning, N.Y.

[73] Assignee: Corning Glasss Works, Corning, N.Y.

[21] Appl. No.: 184,764

[22] Filed: Sep. 8, 1980

[51] Int. Cl.³ .......................... C03C 3/04; C03C 3/10
[52] U.S. Cl. ..................................................... 501/70
[58] Field of Search ........................... 156/52; 313/221

[56] References Cited

U.S. PATENT DOCUMENTS

| | | | |
|---|---|---|---|
| 3,496,401 | 2/1970 | Dumbaugh, Jr. ...................... | 106/52 |
| 3,942,992 | 3/1976 | Flannery ............................... | 106/52 |
| 3,978,362 | 8/1976 | Dumbaugh, Jr. et al. ........... | 106/52 |
| 4,060,423 | 11/1977 | Thomas ................................. | 106/52 |
| 4,180,618 | 12/1979 | Alpha et al. ......................... | 106/52 |

*Primary Examiner*—Earl C. Thomas
*Assistant Examiner*—Mark Bell
*Attorney, Agent, or Firm*—Clinton S. Janes, Jr.

[57] ABSTRACT

The instant invention is concerned with glass envelopes for tungsten-halogen lamps. The glasses exhibit a strain point higher than 750° C., a coefficient of thermal expansion (0°–300° C.) between $42-44 \times 10^{-7}/°C.$, a liquidus temperature below 1300° C., a viscosity at the liquidus of at least 40,000 poises, and consist essentially, in weight percent on the oxide basis, of 64–68% $SiO_2$, 11–14% CaO, 16.5–18.5% $Al_2O_3$, and 2–6.5% SrO+BaO consisting of 0–4% SrO and 0–5% BaO. The preferred glasses demonstrate a viscosity of less than 1000 poises at temperatures no higher than 1520° C. and contain at least 3% total of SrO+BaO, those components being present in a molar ratio SrO:BaO ranging from 2:1–1:2.

2 Claims, No Drawings

GLASS ENVELOPES FOR TUNGSTEN-HALOGEN LAMPS

BACKGROUND OF THE INVENTION

Tungsten-halogen lamps possess several practical advantages when compared with conventional incandescent lamps. First, such lamps can be of small size, e.g., less than 1% of the volume of a conventional lamp, yet produce an equivalent and even greater amount of lumination. Second, the light emitted is whiter than that produced by a regular lamp. Third, the intensity of the illumination emitted remains substantially constant throughout the life of the lamp. Fourth, a tungsten-halogen lamp has a much longer working life than the standard incandescent lamp.

However, such lamps operate at temperatures in excess of 500° C., generally between about 500°–700° C. Consequently, envelopes for such lamps must resist thermal deformation when exposed to those temperatures. Initially, transparent envelopes for such lamps were fabricated from fused quartz and 96% silica compositions sold under the trademark VYCOR since those materials evidenced essentially no thermal deformation during lamp operation. Unfortunately, the processes for producing fused quartz and 96% silica glasses are basically expensive and do not lend themselves to conventional mass production techniques. Furthermore, those products are difficult to form and lampwork and, because of their very low coefficients of thermal expansion, require the use of special sealing techniques to introduce the lead wires into the lamps. Accordingly, research has been continuous and extensive to develop a glass demonstrating melting and forming capabilities suitable for mass producing lamp envelopes and displaying the physical properties necessary for that application. The bulk of this composition research has been undertaken with glasses in the alkaline earth aluminosilicate system. For example:

U.S. Pat. No. 3,496,401 discloses glasses specifically designed for use as glass envelopes in tungsten-iodine incandescent lamps. Those glasses consisted essentially, expressed in weight percent on the oxide basis, of 10–25% alkaline earth metal oxide, 13–25% $Al_2O_3$, 55–70% $SiO_2$, 0–10% $B_2O_3$, and less than 0.1% alkali metal oxide.

U.S. Pat. No. 3,978,362 is concerned with glasses especially suitable as envelopes in tungsten-bromine incandescent lamp. Those glasses exhibited strain points above 700° C., a coefficient of thermal expansion (0°–300° C.) of about $48–55 \times 10^{-7}$/°C., a mismatch with molybdenum metal at the set point of the glass not exceeding 250 PPM (parts per million), an operable melting temperature no higher than 1550° C., a viscosity at the liquidus of at least 100,000 poises, and a liquidus temperature below 1200° C. The compositions therefore consisted essentially, expressed in weight percent on the oxide basis, of about 14–21% CaO, 0–5% MgO, 0–7% BaO, CaO+MgO+BaO being at least 19%, 13–16% $Al_2O_3$, 0–10% SrO and/or $La_2O_3$, and 58–63% $SiO_2$.

U.S. Pat. No. 4,060,423 describes another group of glass compositions statedly demonstrating properties rendering them useful as envelopes for tungsten-halogen lamps. Thus, those glass manifest a strain point of at least 725° C., a liquidus temperature no higher than 1250° C., and a coefficient of thermal expansion (0°–300° C.) of about $42–48 \times 10^{-7}$/°C., and are prepared from compositions consisting essentially, expressed in weight percent on the oxide basis, of 55–68% $SiO_2$, 15–18% $Al_2O_3$, 6–13% CaO, and 6–16% BaO, wherein the weight ratio $Al_2O_3$:CaO+BaO is about 0.6:1 to 1:1.

Finally, U.S. application Ser. No. 92,698, filed Nov. 9, 1979 in the names of P. S. Danielson, W. H. Dumbaugh, Jr., and H. E. Hagy, delineates yet another narrow range of glass compositions especially designed for use as tungsten-halogen lamp envelopes. Those glasses display a strain point higher than 730° C., a liquidus temperature below 1200° C., a viscosity at the liquidus of at least 40,000 poises, a coefficient of thermal expansion (0°–300° C.) less than $48 \times 10^{-7}$/°C. but greater than $43 \times 10^{-7}$/°C., and axial compression at room temperature not exceeding 150 PPM at 500° C. when sealed to molybdenum metal. As expressed in weight percent on the oxide basis, those glasses consist essentially of 61–65% $SiO_2$, 14–17% $Al_2O_3$, 8–15% CaO, and 6–9% SrO.

Glasses encompassed within each of the above disclosures have been manufactured for use as tungsten-halogen lamp envelopes. However, none has been deemed an optimum for that application either in terms of manufacturing capability and/or physical properties.

Thus, there are three critical physico-chemical properties associated with glass manufacturability and lamp performance which must be optimized in a glass comprising the envelope of a tungsten-halogen lamp. These are: (1) the liquidus temperature or the maximum temperature of devitrification; (2) the strain point, i.e., the temperature where a glass exhibits a viscosity of $10^{14.6}$ poises; and (3) the coefficient of thermal expansion.

The maximum temperature of devitrification is of vital concern during the melting and forming of a glass article. Molten glass is delivered from a melting unit and normally formed into a desired shape at a temperature above that at which the glass composition will devitrify at an appreciable rate. Envelopes for tungsten-halogen lamps are formed from glass tubing. In the manufacture of glass tubing, it has been deemed more appropriate to specify a minimum viscosity at the liquidus temperature, rather than an arbitrary maximum temperature of devitrification, since temperature-viscosity relationships vary significantly from one glass composition to the next. A useful guide line for defining a suitable composition for preparing glass tubing holds that the maximum temperature of devitrification should occur at or below a temperature corresponding to a glass viscosity of 30,000 poises. Whereas in theory there is no temperature limit if the glass viscosity is sufficiently high, there is a practical constraint imposed by the thermal endurance of the melting and forming equipment. I have found that glasses suitable for forming tubing utilizing a conventional Vello process must have liquidus temperatures below 1300° C.

The strain point provides an indication of the thermal endurance exhibited by a glass, as well as the temperature near which stresses begin to develop in glass-to-metal seals. The light output of tungsten-halogen lamps increases as the temperature of operation thereof is raised. Accordingly, producers of such lamps have continually sought to operate their lamps at ever higher temperatures and I have found that, to satisfy that trend, envelope glasses ought to exhibit strain points in excess of 750° C.

The combination of strain point and the coefficient of thermal expansion of the glass is a critical factor in determining the amount and kind of stress developed when a glass-to-metal seal is cooled from the sealing temperature (and subsequently reheated during lamp operation). In the case of tungsten-halogen lamps, the metal leads are fashioned from molybdenum which has a relatively constant coefficient of thermal expansion of about $55 \times 10^{-7}/°C$.

Previous glass research developed glasses closely matching the expansion coefficient of molybdenum. For example, U.S. Pat. No. 3,978,362, supra, discloses glasses exhibiting coefficients of thermal expansion (0°-300° C.) within the range of $48-55 \times 10^{-7}/°C$. Mismatch to molybdenum metal was estimated by comparing expansion curves of each from the set point of the glass to room temperature.

More recent developments in the study of glass-to-metal seal stresses have utilized photoelastic analysis of actual seals between molybdenum wire and glass. For example, S. M. Rekhson, *Glass Technology*, 20, No. 1, 1979, gives a general overview of the method and application Ser. No. 92,698, supra, deals explicitly with cylindrical seals to molybdenum metal wire. Those discussions have improved the understanding of residual stresses which are generated upon cooling a glass-to-metal seal of simple geometry from the set point to room temperature. Thus, different heat treatments may be considered and good estimates of room temperature stress can be made as a function of the thermal expansivity of the glass. By utilizing that procedure, application Ser. No. 92,698, supra, concluded that glasses having coefficients of thermal expansion within the range of $>43 \times 10^{-7}/°C$. but $>48 \times 10^{-7}/°C$. were suitable for tungsten-halogen lamp envelopes.

However, still more recent evaluations of actual tungsten-halogen lamps, after life testing, have modified the previous understanding of residual stresses developed upon cooling glass-to-metal seals of simple geometry. Specifically, examinations of lamps operated at full power for extended periods of time to simulate actual use conditions have found that additional stresses develop in the glass-to-metal seal area due to non-uniform heating of the glass, the complex geometry of the seal, and, perhaps, some high temperature relaxation. Consequently, glasses which demonstrate desirably low sealing stresses in cylindrical bead seals can still exhibit inferior performance when employed as envelopes in tungsten-halogen lamps. I have found through these analyses of residual stresses in tested lamps that a coefficient of thermal expansion (0°-300° C.) of about $43 \times 10^{-7}/°C$. is the optimum value. Accordingly, the coefficient of thermal expansion of the glass will be held between $42-44 \times 10^{-7}/°C$.

SUMMARY OF THE INVENTION

I have discovered that the above-defined values for those three critical physico-chemical properties, in conjuntion with other characteristics conventionally required in envelope glasses for tungsten-halogen lamps such as good chemical durability, transparency, freedom from color, and the like, can be satisfied within an extremely narrow range of compositions within the alkaline earth metal aluminosilicate system. Hence, I have found that the desired requirements for coefficient of thermal expansion, strain point, and liquidus can be simultaneously achieved only in compositions wherein a carefully delineated combination of CaO and SrO and/or BaO is present with $Al_2O_3$ and $SiO_2$. Accordingly, the inventive compositions consist essentially, expressed in terms of weight percent on the oxide basis, of 64-68% $SiO_2$, 11-14% CaO, 16.5-18.5% $Al_2O_3$, and 2-6.5% SrO+BaO consisting of 0-4% SrO and 0-5% BaO.

Experience has indicated that, where CaO or a combination of CaO+MgO constitutes the sole alkaline earth metal oxide content, the liquidus temperatures are generally too high. Excess amounts of SrO commonly result in liquidus temperatures and coefficients of thermal expansion which are too high. Greater levels of BaO normally lead to glasses demonstrating strain points which are too low, coefficients of thermal expansion which are too high, or which suffer from undesirable viscosity-temperature effects at high temperatures. The preferred glasses contain a combination of SrO+BaO, the total of which will be at least 3% by weight, and they will be present in a molar ratio SrO:BaO ranging from about 2:1 to 1:2. This combination appears to exert a mixed alkaline earth metal effect which improves the high temperature viscosity relationship of the glasses. For example, such glasses can exhibit a 1000 poise viscosity at temperatures no higher than 1520° C. In contrast, glasses containing only SrO or BaO require temperatures approaching 1550° C. and even higher to achieve a like viscosity. This feature is highly desirable in melting and forming operations.

DESCRIPTION OF THE PREFERRED EMBODIMENTS

Table I records several glass compositions, expressed in terms of parts by weight on the oxide basis as calculated from the batch, which illustrate the parameters of the instant invention. Inasmuch as the sum of the constituents totals or approximately totals 100, for all practical purposes the individual components can be considered to be reported in terms of weight percent. Table IA lists the constituents in approximate mole percent as calculated from the batches. The actual batch ingredients can comprise any materials, either the oxides or other compounds, which, when melted together, will be converted into the desired oxides in the proper proportions. To illustrate, $CaCO_3$ can provide the source of CaO and $SrCO_3$ the source SrO.

The batch materials were compounded, ballmilled together to assist in securing a homogeneous melt, and then placed into platinum crucibles. The crucibles were introduced into a furnace operating at 1650° C. and the batches melted for about 16 hours. The crucibles were thereafter removed from the furnace, the melts poured into steel molds to produce glass slabs having dimensions of about $6'' \times 6'' \times \frac{1}{2}''$, and the slabs immediately transferred to an annealer operating at about 810° C. (Although the exemplary compositions reported below were in the form of laboratory melts only, it will be appreciated that larger commercial melts thereof can be undertaken in pots or continuous melting units.)

TABLE I

|  | 1 | 2 | 3 | 4 | 5 | 6 | 7 |
| --- | --- | --- | --- | --- | --- | --- | --- |
| $SiO_2$ | 65.80 | 65.30 | 65.30 | 67.30 | 67.50 | 64.80 | 66.30 |
| $Al_2O_3$ | 17.30 | 17.20 | 17.20 | 17.70 | 17.20 | 17.00 | 17.40 |
| CaO | 12.95 | 12.90 | 12.00 | 15.00 | 12.10 | 11.90 | 13.10 |
| SrO | 1.60 | — | 3.20 | — | 3.20 | 1.60 | 3.20 |
| BaO | 2.35 | 4.70 | 2.40 | — | — | 4.70 | — |

TABLE IA

|       | 1    | 2    | 3    | 4    | 5    | 6    | 7    |
|-------|------|------|------|------|------|------|------|
| $SiO_2$   | 71.7 | 71.7 | 71.7 | 71.7 | 73.0 | 71.7 | 71.7 |
| $Al_2O_3$ | 11.1 | 11.1 | 11.1 | 11.1 | 11.1 | 11.1 | 11.1 |
| CaO   | 15.2 | 15.2 | 14.1 | 17.2 | 14.0 | 14.1 | 15.2 |
| SrO   | 1.0  | —    | 2.0  | —    | 2.0  | 1.0  | 2.0  |
| BaO   | 1.0  | 2.0  | 1.0  | —    | —    | 2.0  | —    |

Table II records measurements of several physical properties determined on the above-recited glasses, the measurements being conducted in accordance with techniques conventional in the glass art. The annealing point (Ann. Pt.) strain point (Str. Pt.), internal liquidus (Liq.), and viscosity at 1000 poises ($10^3$ poises) are tabulated in °C. and the viscosity at the liquidus (Liq. Visc.) in poises. The coefficient of thermal expansion (Coef. Exp.) was determined over the range of 0°–300° C. and is reported in terms of $\times 10^{-7}/°C$.

TABLE II

|           | 1      | 2      | 3    | 4      | 5    | 6    | 7    |
|-----------|--------|--------|------|--------|------|------|------|
| Ann. Pt.  | 807    | 807    | 806  | 816    | 815  | 805  | 812  |
| Str. Pt.  | 757    | 756    | 755  | 765    | 764  | 755  | 762  |
| Coef. Exp.| 43.2   | 43.5   | 43.4 | 41.6   | 41.2 | 43.4 | 42.7 |
| Liq.      | 1278   | 1266   | 1280 | 1300   | 1295 | 1268 | 1275 |
| Liq. Visc.| 40,000 | 45,000 |      | 30,000 |      |      |      |
| $10^3$ poises | 1506 | 1555 |      |        |      |      |      |

Example 4 illustrates the high liquidus temperature resulting when SrO and BaO are absent from the glass composition. A comparison of Examples 1 and 2 demonstrates the beneficial, mixed alkaline earth metal effect upon high temperature viscosity which the combination of SrO+BaO imparts to the glass. The most preferred embodiment of the inventive compositions is Example 1.

I claim:

1. A glass composition suitable as an envelope for a tungsten-halogen lamp and for sealing to molybdenum metal, said glass exhibiting a strain point higher than 750° C., a coefficient of thermal expansion (0°–300° C.) between $42-44\times 10^{31}$ 7/°C., a liquidus temperature below 1300° C., a viscosity at the liquidus of at least 40,000 poises, a viscosity of less than 1000 poises at temperatures no higher than 1520° C., and consisting essentially, expressed in terms of weight percent on the oxide basis, of 64–68% $SiO_2$, 11–14% CaO, 16.5–18.5% $Al_2O_3$, and 3–6.5% SrO+BaO, consisting of 0–4% SrO and 0–5% BaO, those latter two components being present in a molar ratio SrO:BaO ranging from 2:1–1:2.

2. A glass according to claim 1 having the approximate composition:

$SiO_2$: 65.80
$Al_2O_3$: 17.30
CaO: 12.95
SrO: 1.60
BaO: 2.35

* * * * *